Figures 1, 2, 3:
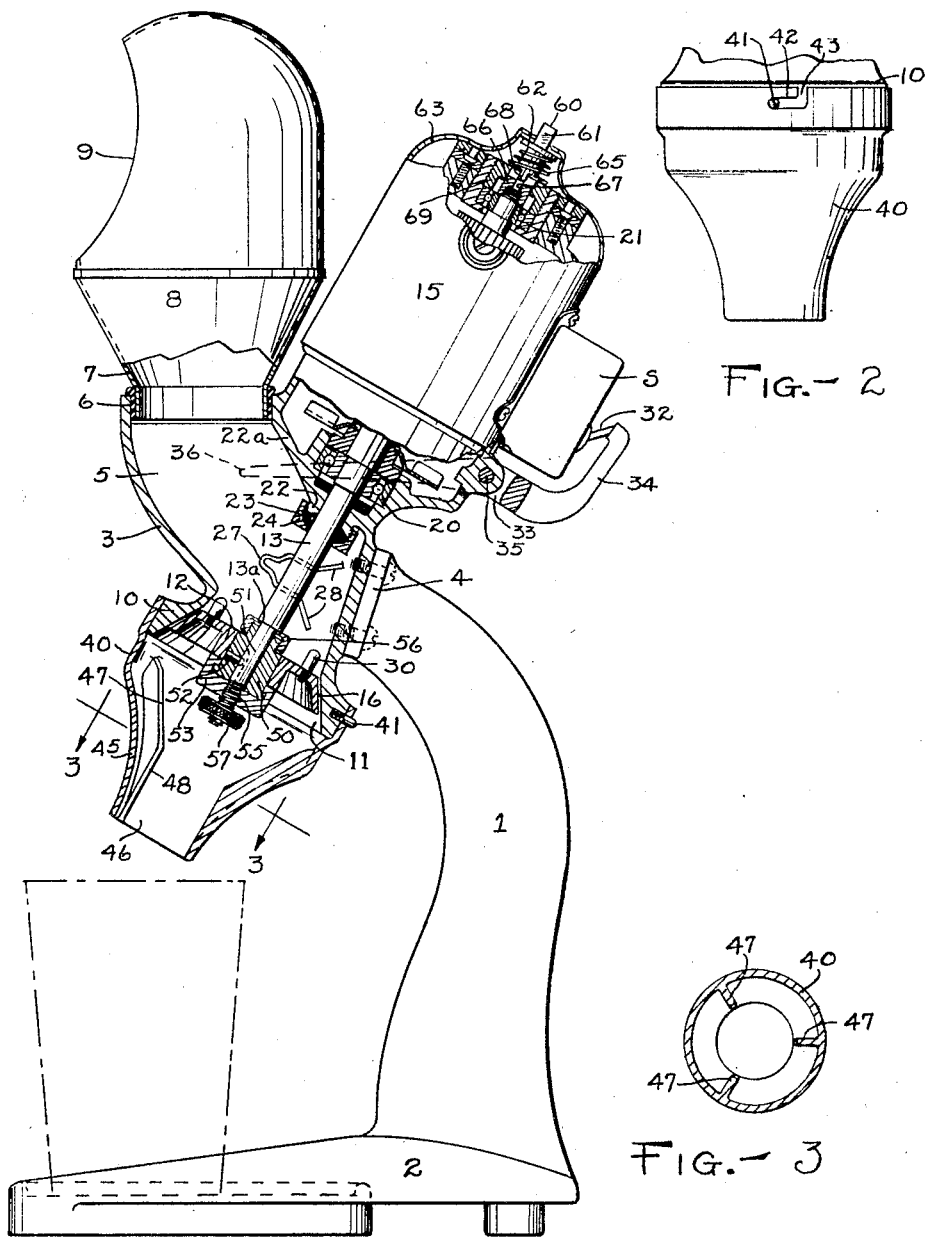

Sept. 10, 1929.　　W. H. POESSE　　1,727,410

MATERIAL TREATING MACHINE

Filed June 8, 1927

Inventor

Walter H. Poesse

By Bates, Macklin, Golrick & Meare

Attorneys

Patented Sept. 10, 1929.

1,727,410

UNITED STATES PATENT OFFICE.

WALTER H. POESSE, OF CLEVELAND, OHIO, ASSIGNOR TO THE DOMESTIC ELECTRIC COMPANY, OF CLEVELAND, OHIO, A CORPORATION OF OHIO.

MATERIAL-TREATING MACHINE.

Application filed June 8, 1927. Serial No. 197,299.

This invention is in the nature of an improvement in mechanism for treating liquids and solids of various characteristics to produce a homogeneous liquid mass.

It has been found that where two comparatively smooth closely adjacent though non-contacting surfaces are moved, as by rotation, past each other at high velocity, a heterogeneous mixture of liquids and solids fed between such surfaces may be quickly reduced to a uniform liquid solution irrespective of the lack of natural affinity between such liquids and solids to be mixed.

The machine shown in the drawing embodies this principle in the form of complementary internal and external frusto-conical members; the member having the external conical surface being arranged for rotation by an electric motor. The machine is primarily designed to serve as a drink mixer and with the conical surfaces separated from ten to twenty-five thousands of an inch and with a motor speed of about 11,000 R. P. M. a quantity of milk, powdered malt compound, fresh or preserved fruit such as oranges, bananas, strawberries or the like, sufficient for an ordinary drink, may be reduced in a very few seconds to a homogeneous liquid mass. The indissoluble pulp and seeds of such fruit remain in the receiving chamber.

Because of the high relative velocity of the rotating cones, the mixed material is discharged in a rapidly whirling condition and even though a comparatively long discharge tube is used, the whirling condition continues to the end of such tube and then the material spreads outwardly with considerable force.

An object of the present invention is to provide a discharge device in connection with a machine of the character referred to, which will be compact and which will discharge the mixture in the form of a direct stream. Otherwise stated, the object is to provide a device for discharging the mixture in the form of a stream at a short distance from the mixing surfaces.

Because material which is not readily dissolved, such as fruit pulp and seeds do not pass the mixing surfaces the receiving chamber has to be frequently cleaned. A convenient method is to partially remove the rotor and then flush out the chamber past the separated conical surfaces. A further object of the invention is to provide a simple and convenient device to enable such removal or partial removal to be accomplished quickly.

Further objects and features will become apparent from the following description which refers to the accompanying drawing, wherein I have shown my preferred form. The essential novel characteristics will appear in the claims.

In the drawings, Fig. 1 is a side elevation of a drink mixing machine embodying my invention, certain of the parts of the machine being broken away and shown in substantially central longitudinal cross section; Fig. 2 is a side elevation of the discharge tube, viewed from a point at right angles to Fig. 1; and Fig. 3 is a detailed cross-sectional view as indicated by the line 3—3 on Fig. 1.

Referring in detail to the drawing, 1 indicates a suitable support formed with a base portion 2 adapted to rest upon a table to which support is secured a main housing and motor support member 3 as at 4. The housing 3 is preferably a casting formed to provide a material receiving chamber 5 having a cylindrical opening 6 at its upper end to receive the reduced end 7 of a charging member 8 similar to a funnel. This charging member is cut away at 9 to allow materials to be mixed to be dumped into the receiving chamber 5. The receiving chamber 5 terminates at the bottom in an outwardly flared annular portion 10, the inner surface of which is frusto-conical as at 11. A rotor, forming one member of the mixer, is indicated generally at 12, and is supported on a shaft 13, the latter being the armature shaft of a motor 15 extended as shown. The rotor 12 has its outer peripheral surface 16 formed complementary to internal conical surfaces 11 and the conical surfaces are normally spaced very closely together but not in contact. For example, in a machine for mixing materials such as above mentioned, the distance varies from .010 to .025 inches. Suitable adjustment may be used to effect these variations, as will be presently shown.

The motor armature shaft and rotor are axially inclined as shown mainly for convenience in receiving the material to be mixed and discharging the mixture. Suitable ball bearings shown at 20 and 21 serve to support the shaft 13 at either side of the armature, these bearings serving to take both radial and end thrust in order to minimize the bearing surfaces and insure the maintenance of the desired air-gap between the conical surfaces. For preventing oil from flowing down the shaft 13 and into the chamber 5 where it might foul the mixture, although particularly for preventing liquid to be mixed from traveling back upwardly along the shaft 13 into the motor casing, I provide a packing arrangement consisting, as shown, of a tubular extension 22 depending from the upper chamber wall 22$^a$ which divides the receiving chamber from the motor housing, the projection being formed to receive packing 23, and to support a packing nut 24.

Interposed between the packing nut 24 and the rotor and supported by the shaft, is a food chopping member 27 shown as consisting of a member similar to a split cotter pin having its legs thrust through separated openings in the shaft 13 and bent outwardly as at 28, to hold it in place. As the shaft is rotated, the projections afforded by this member 27 break up the larger pieces of solid material into particles that are small enough to be carried with the liquid between the conical surfaces. Such particles are further broken up and forcibly projected toward the gap between the conical surfaces by a plurality of pins, such as 30, secured to the top surface of the rotor.

Suitable means for energizing the motor may comprise a switch S having a controlling part 32 arranged to be depressed, from the position shown, to start the motor. A main operating lever 33 supported on a horizontally extending pin 35 in the main housing may have an upward extension 34 for engaging the part 32 and a pair of manually depressible arms extending forwardly around the receiving chamber, one at each side thereof for convenience.

With the above described arrangement the operator simply deposits the materials to be disintegrated or emulsified in a suitable container in the proper proportions, then dumps this mass through the opening 9, letting it fall into the chamber 5, and then starts the motor by pressing downwardly on one or both of the arms 36. The liquid by reason of the rapidly revolving rotor is immediately fed into the gap between the rotor and internal cone by centrifugal force acting on the air already in the gap between the conical surfaces, and later on the liquid itself.

The members 27 and 30 break up the larger pieces of solid material and force such particles to follow the liquid, as above explained.

The extremely high velocity of the rotor causes the film of material to leave the gap in a rapidly whirling condition. Heretofore, it has been necessary to use a catcher receptacle the walls of which extended upwardly past the discharge opening in order to prevent loss of the mixed material. This was true to a greater or less extent irrespective of the length of the tube provided to conduct the whirling material away from the cone surfaces. A very long tube is of course unsuitable for the reason that the whole machine must be compact in order to be satisfactory as a drink mixer.

To overcome the disadvantages resulting from the rapidly whirling condition of the discharged material, I provide a short tube 40 which may be detachably secured to the annular portion 10. Preferably the tube has one or more slots 42 open at the top as at 43 for engaging corresponding pins 41 on the housing, this constituting the well known bayonet lock. The tube or sleeve 40 extends substantially parallel with the axis of rotation of the rotor for a short distance and then gradually inwardly, terminating in a restricted opening 46. For causing the whirling body of mixed material to leave the discharge end 46 of the tube in a comparatively direct stream as distinguished from a diverging disc or spray, I provide fin like members 47 extending practically the entire length of the tube. The fins gradually decrease in height from the point 48 to the end of the sleeve, mainly for convenience in forming the tube by casting.

As the film of mixed material leaves the rotor surface it travels rapidly along the lowermost surface 11 in a spiral, is then deflected downwardly along the inner surfaces of the tube 40 and between the fins which act as a series of dams to gradually decrease the whirling movement. This process continues all along the tube until the material is finally discharged in a comparatively rapid but direct stream.

Suitable means for securing the rotor to the shaft 13 may comprise a sleeve 50 slidably fitting the reduced portion 51 of the shaft 13 and keyed thereto as at 52. The sleeve 50 has rotatably fixed thereto a ferrule 53 which ferrule is threaded at 55 to the reduced portion 51 of the shaft 13. An adjusting nut 56 is shown at the upper end of the sleeve 50 and bearing against a shoulder 13$^a$ on the shaft 13 adjacent the reduced portion 51. The extreme lower end of the shaft 13 carries a knurled nut 57 on a smaller diameter thread than at 55, this knurled nut being ordinarily locked tight against a shoulder adjacent the threads 55 to serve as a stop for limiting the downward movement of the rotor. In order to clean the chamber 5 of material such as fruit seeds or pulp, the member 53 is simply turned relative to the shaft 13 which pulls the rotor downwardly, the sleeve 50 simply sliding along the shaft without turning relative to it. This increases the gap between the rotor and internal conical surfaces 11 a sufficient amount to allow the pulp and seeds of fruit or other indissoluble material, which cannot pass through the gap while the machine is in mixing operation, to now pass downwardly and through the sleeve 40, where it may be caught and thrown away.

When an electric motor is used for driving the rotor, some means is necessary to hold the armature shaft against rotation in order to turn the nut 53 on the rotor to separate the conical surfaces. This may be done by holding the rotor with one hand and operating the nut with the other. This however, is extremely inconvenient on account of lack of room in which to work.

I have devised a very simple means for holding the shaft against rotation, as illustrated at the top of Fig. 1. The means comprises, as shown, a spring pressed plunger 60 having squared or faced-off surfaces 61 slidably fitting an opening through the very top of a cap member 63 forming a motor cover or casing. The plunger 60 is normally held outwardly by reason of a spring 65 pressing downwardly on a bearing retaining nut 69. a part of the motor assembly, and upwardly against a flange 62 on the plunger. The upper end of the armature shaft carries a bearing locking nut 66 slotted as at 67 and the slot may be engaged by the flattened lower end 68 of the plunger 60. When it is desired to lower the rotor on the shaft to separate the conical surfaces for cleaning, the operator simply depresses the plunger 60 causing the flattened end 68 to enter the slot 67 in the nut 66 whereupon the shaft 13 is prevented from turning through the agency of the flattened surfaces 61 on the plunger. After the rotor has been lowered, the machine cleansed and the rotor again raised, the operator releases the plunger 60 and it springs upwardly into place clear of the armature shaft.

I claim:—

1. In a machine of the character described, a rotor and stator having closely positioned surfaces for mixing material, means for rapidly turning the rotor to thereby deliver the mixed material from between the said surfaces in a rapidly whirling condition, tubular means arranged to guide the mixed material so fed, and means associated with the tubular means to cause the material to be finally discharged in a comparatively non-whirling condition.

2. In a machine of the character described, means for treating liquid and solid material to disintegrate and mix the material, including a rotor and stator whereby the treated material is initially discharged from said means in a rapidly whirling condition, a tube for receiving the treated material, and abutment means extending inwardly from the wall of the tube for engaging the whirling material, whereby the material is discharged from the tube in a substantially direct stream.

3. In a device of the class described, a pair of members having closely adjacent non-contacting surfaces, means for rotating one member relative to the other at high velocity, means to supply at least partially liquid material between said surfaces, and receiving and discharging means for the resultant mixture comprising a tubular member having radially spaced means extending inwardly from its walls to oppose the whirling motion of liquid fed from between said non-contacting surfaces.

4. In a device of the class described, a pair of members having closely adjacent non-contacting surfaces, means for rotating one member relative to the other at high velocity, means to supply at least partially liquid material between said surfaces, and receiving and discharging means for the resultant mixture comprising a tubular member of decreasing cross-sectional area toward the discharge end and having radially spaced fins extending abruptly inwardly from its walls to oppose the whirling motion of liquid fed from between said non-contacting surfaces.

5. In a drink mixer, a housing having conical surfaces, a frusto-conical rotor with its conical surfaces in close proximity to the conical surfaces of the housing, means for supplying material in at least partially liquid form to said conical surfaces and feeding such material outwardly by rotating the rotor at high velocity, tubular discharge means for receiving the material from the base of the rotor and confining its outward movement, and means extending inwardly from the last named means toward the rotor axis and positioned to oppose the whirling movement of the material as it moves along the discharge means.

6. In combination a relatively stationary member having an internal conical surface, a relatively rotatable member having a substantially complementary external conical surface positioned close to the internal surface, means to rotate the last named member at high speed to produce a liquid mixture, tubular discharge means for such mixture detachably secured to the stationary member and comprising outer walls and means rigid therewith to oppose the whirling motion of the mixed liquid whereby such mixture is finally discharged in a comparatively non-whirling stream.

7. In combination, a stationary member having a mixing surface, a relatively rotatable member having a cooperating mixing surface close to the first mentioned surface, a shaft having an endwise adjustable connection with the rotatable member, means to rotate the shaft at high speed to produce a liquid mixture, and manually operable means having an interruptable connection with the shaft to prevent the free rotation of the shaft, whereby said endwise adjustment may be easily effected.

8. In combination, a stationary member having a mixing surface, a relatively rotatable member having a cooperating mixing surface positioned close to the first mentioned surface, an electric motor, and an armature, a shaft having a threaded connection with the rotatable member for rotating the latter member at high speed to produce a liquid mixture, and manually operable means having an interruptable connection with the shaft to prevent the free rotation of the shaft when the motor is deenergized, whereby the rotatable member may be adjusted at such time on the shaft at the threaded connection.

9. In a device of the class described a housing having conical surfaces, a motor armature shaft supported by said housing, a rotor carried by the shaft having conical surfaces closely adjacent said conical surfaces of the housing, means for supplying material between said conical surfaces whereby said material is mixed by the rotation of the rotor, means for moving the rotor with respect to the shaft by a turning movement and manually operable means normally maintained in idle position and having a connection with the armature shaft for holding said shaft to permit such turning movement.

10. In a device of the class described, a housing having conical surfaces, a frustoconical rotor with its conical surfaces positioned close to the said surfaces of the housing, means including a shaft for rotating it, means for supplying material in at least partially liquid form to said conical surfaces and feeding such material outwardly by rotating the shaft at high velocity, means to move the rotor axially with reference to the housing operative by reason of the rotor being turned with reference to the shaft, and manually operable means interruptably connected to the shaft to at such time hold the shaft against rotation relative to the housing.

11. In a device of the class described, a stationary member having a mixing surface, a relatively rotatable member having a cooperating mixing surface in close proximity to the first mentioned surface, a high speed electric motor including an armature shaft supported by said stationary member, said armature shaft having a threaded connection with the rotatable member, and resilient stressed non-rotatable means carried by the motor housing and adapted to be moved manually into contact with said shaft to prevent its rotation whereby said threaded connection between the rotatable member and shaft may be affected to adjust the distance between said mixing surfaces.

In testimony whereof, I hereunto affix my signature.

WALTER H. POESSE.